United States Patent Office 2,812,724
Patented Nov. 12, 1957

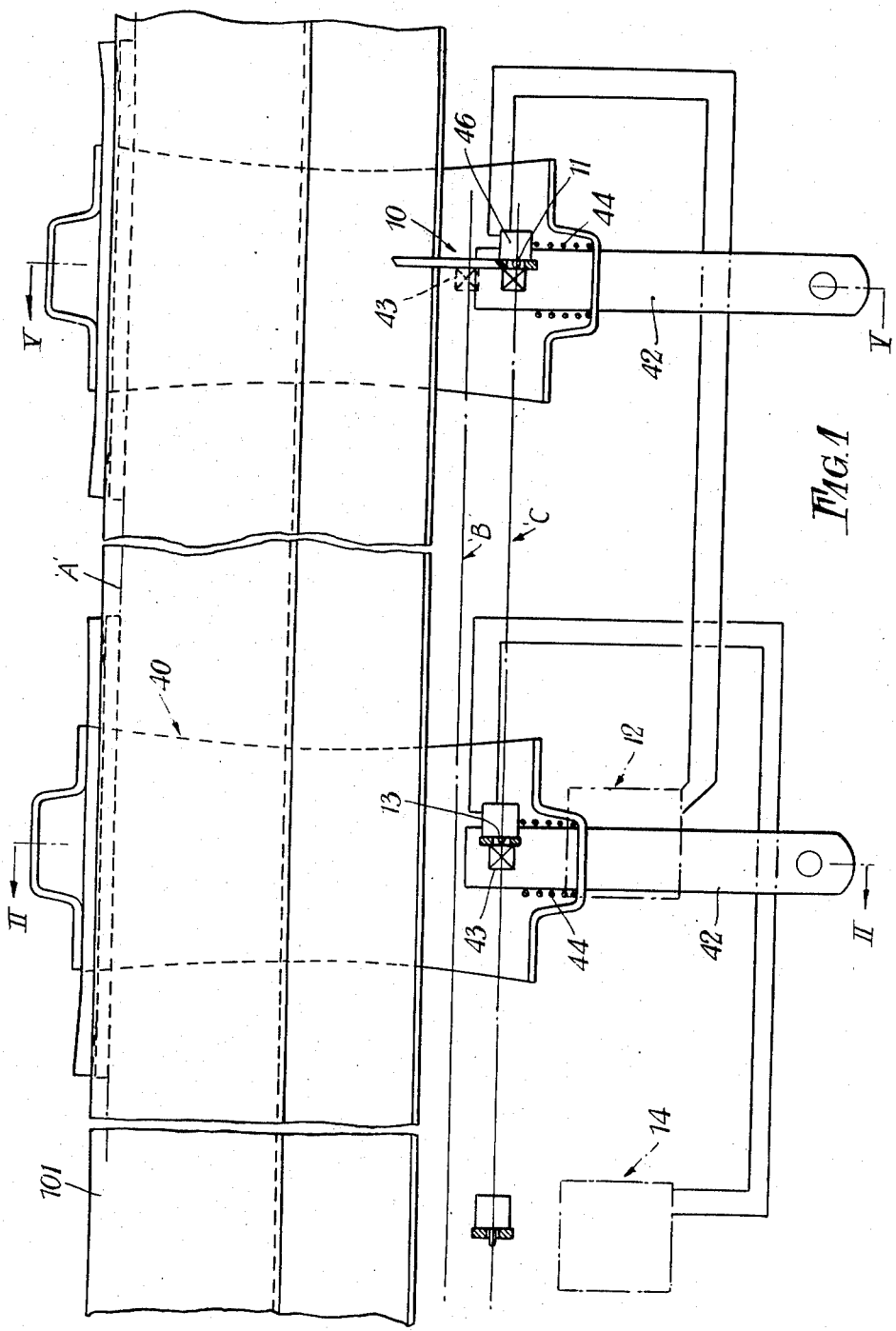

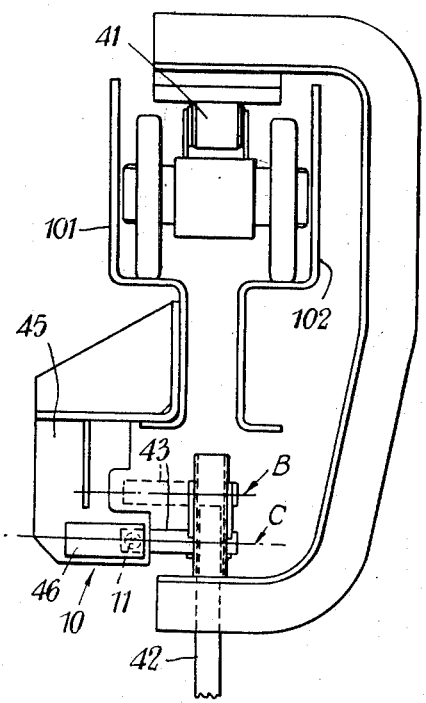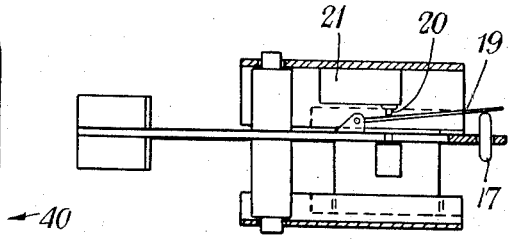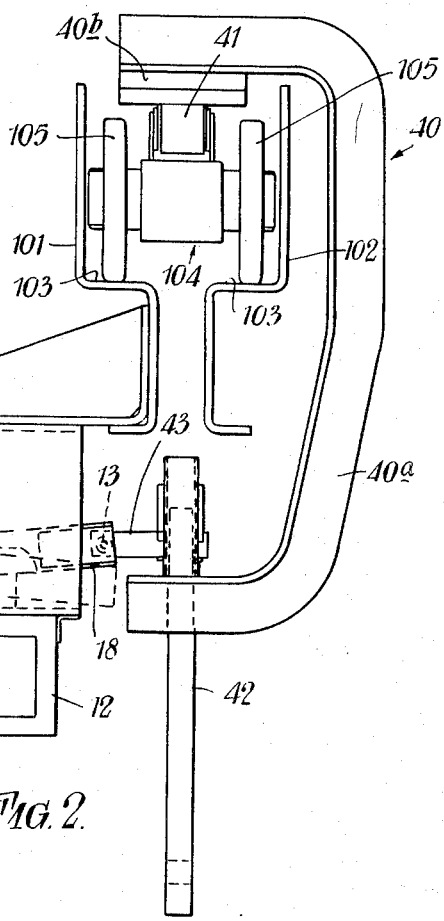

2,812,724

CONVEYOR SYSTEMS

Donald Mayer King, Stevenage, England

Application December 8, 1953, Serial No. 396,910

Claims priority, application Great Britain
December 10, 1952

3 Claims. (Cl. 104—172)

This invention relates to conveyor systems and more particularly to such systems of the kind wherein load carriers are supported on one or more endless chains in such a manner that while normally carried along by said chain or chains they may nevertheless be stopped, at any time without in any way interrupting or interfering with the drive to the chain or chains. Such systems are, for example, described in my application Serial No. 292,627, filed June 10, 1952.

It is the chief object of the invention to evolve means whereby the movement of load carriers through or around a conveyor system of the kind indicated above may be controlled automatically.

In accordance with one aspect of the invention, an indexing mechanism is provided which is adapted to hold a preselected number of load carriers in a selected section of the conveyor, the arrangement being such that as the foremost carrier is unloaded, it will be automatically released and will be thereafter progressed along the conveyor path while the succeeding carriers held by the mechanism will move forwardly successively to the unloading point, such succeeding carriers being moved forwardly by one stage or station on each occasion that an unloaded carrier is released.

In accordance with another aspect of the invention, means are associated with each load carrier or an element associated therewith, such means being adapted to be set to actuate any preselected one of a plurality of sets of contacts or switches disposed at spaced points along the conveyor path, the arrangement being such that on operation of one set of such contacts or switches, a transfer arm, thruster or the like will be actuated, thereby to transfer the carrier laterally with respect to the conveyor and on to a further conveyor, stationary or movable platform or the like.

In accordance with yet a further aspect, means are provided to direct load carriers from a "live" to a "dead" line and means are disposed adjacent said "dead" line which are adapted to be operated intermittently to progress said carriers therealong.

In order that the said invention may be clearly understood and readily carried into effect, the same will be hereinafter more fully described with reference to the accompanying diagrammatic drawings, in which:

Fig. 1 is a side elevational view of a conveyor system incorporating one form of indexing mechanism in accordance with this invention;

Fig. 2 is a sectional view taken along the line 2—2 of Fig. 1;

Fig. 3 is a top elevational view of a movable stop member included in the structure illustrated in Fig. 2;

Fig. 4 is a sectional view taken along the line 4—4 of Fig. 2, but showing a modification of the device; and Fig. 5 is a sectional view taken along the line 5—5 of Fig. 1.

In the following description it will be assumed that the indexing mechanism is designed for use in a conveyor system wherein load carriers are supported on one or more endless chains which is or are continuously driven, the arrangement being such that any of said load carriers may be stopped at any required point along the conveyor path without interfering with or interrupting in any way the drive to the conveyor chain or chains. It is also assumed that each load carrier will have a depending load bar which is spring loaded and is capable of limited vertical movement, the bar being depressed when loaded and moved upwardly under the action of its spring when unloaded. Conveyors of the kind indicated above are more fully described in the specification of my co-pending patent application, Serial No. 292,627, filed June 10, 1952.

However, for the purpose of providing a clear explanation of the present invention, a general description of a suitable conveyor having the above characteristics is given below with reference to Figs. 1 and 2 of the drawings. Such a conveyor may include two parallel, laterally spaced tracks 101 and 102 having relatively widely spaced apart upper portions and relatively close-together lower portions (Fig. 2) to define upwardly facing shoulders 103 therebetween. A conveyor chain, generally identified by the reference numeral 104, moves between the upper portions of tracks 101 and 102 and the links of the chain 104 carry rollers 105 which ride on the shoulders 103.

Each of the load carriers, generally identified by the numeral 40, includes a C-shaped frame 40a which, at its opposite ends, extends above and below the tracks 101 and 102. Each frame 40a is supported, at its upper end, on the conveyor chain 104 in a manner to normally be transported by the latter, although the load carriers 40 may be halted without interrupting the drive of the chain 104. For example, as shown in the drawings, the upper end of the frame 40a may have a skid or plate 40b welded, or otherwise secured, to its lower surface, the skid 40b riding upon rollers 41 which are rotatably mounted on top of the links of chain 104. The normal frictional resistance to rotation of the rollers 41 is sufficient to cause the skid 40b and the related load carrier 40 to be carried along by the moving chain. However, when the load carriers are halted, the rollers 41 rotate to permit the uninterrupted movement of the conveyor chain 104.

Further, each load carrier 40 includes a vertical load bar 42 extending slidably through the lower end of the frame 40a and having an abutment member or peg 43 extending laterally from its upper end portion. A spring 44 acts on the bar 42 to urge the latter upwardly when the load is removed from the bar.

In Figure 1, an indexing mechanism is shown which is designed to provide for the marshalling or holding of a selected number of load carriers in a preselected section of a conveyor system of the kind indicated and for the automatic release of such carriers successively from such section as they are unloaded. The indexing mechanism conveniently comprises a final stop which is designated generally by 10, such stop being fixedly mounted, for example, on a bracket 45 (Fig. 5) depending from the track 101, in position at or adjacent the selected holding or marshalling section of the conveyor system. The stop 10 incorporates a movable element or striker 11 which is so disposed as to lie in the path of laterally projecting pegs 43 carried by the depending load bars 42 of the load carriers.

It will be appreciated from the foregoing description that a laterally directed peg carried by the load bar of any load carrier will assume one or other of two positions, i. e. an upper or a lowermost position depending upon whether the load bar is unloaded or loaded. In Figure 1, A designates the level of the chain or chains on which the load carriers are supported. B designates the level of the path of travel of pegs present on free or unloaded load bars and C designates the path of travel of pegs present on load bars supporting a load. It will be seen that in the arrangement illustrated in Figure 1 the movable element or striker 11 associated with the final stop 10 of the indexing mechanism is disposed at the level C, i. e. in the path of the pegs 43 when the latter are in their lowermost position corresponding to the loaded condition of the load bars. The movable element or striker 11 constitutes the actuating element of a limit switch 46 which is normally closed, the latter being disposed in a circuit for energizing a solenoid designated 12. The solenoid 12 is associated with a pivoted or hinged stop which is arranged at a preselected point in the conveyor path preceding said final stop 10 and the arrangement is such that on stoppage of a load carrier at the final stop and subsequent opening of the limit switch 46 which is normally closed, the solenoid 12 will be de-energised thereby to allow the pivoted or hinged stop to swing under the action of a balance weight or spring into an operative position wherein it will stop the next following load carrier. The pivoted or hinged stop also incorporates a movable element or striker 13 which is adapted, when said stop is in its operative position, to lie in the path of the laterally projecting peg 43 carried by the next following load carrier. As before, such movable element or striker 13 constitutes the actuating element of a limit switch controlling the operation of a solenoid 14 associated with a second pivoted or hinged stop disposed at a preselected point on the conveyor path preceding said first hinged or pivoted stop. It will be obvious that any number of pivoted or hinged stops may be provided, depending on the number of load carriers which it is desired to hold in the selected section of the conveyor system, each of such stops being adapted to be actuated on stoppage of a carrier at the next forward one.

The arrangement above described is such that when the load carrier held at the final stop 10 is unloaded, the load bar 42 thereof will move upwardly thereby to move the laterally directed peg 43 above the level of the stop, so that the load carrier will be then again transported by the driven chains of the conveyor system. Removal of the peg 43 from engagement with the fixed stop will release the movable element or striker 11 carried thereby thus allowing the limit switch 46 to assume its normally closed position. Closure of such switch will result in re-energisation of the solenoid 12 at the first preceding station and movement of the first hinged or pivoted stop into an inoperative position to allow forward movement of the load carrier previously held thereby. Release of the load carrier from the first preceding station will result in release of the carrier at the second preceding station and so on. The carrier released from the first preceding station will move up to the final stop where it will be arrested with the result that the following load carriers will be successively arrested at the preceding stations. Upon unloading of the carrier at the final stop, the whole process above described will be repeated, the carriers at the preceding stations being progressively moved forwardly by one station on completion of each cycle of operation.

As indicated in Figure 2, each hinged or pivoted stop may conveniently comprise a pivoted double armed lever or the like 15, for example, mounted on a bracket 47 depending from the track 101, one of the arms of the lever 15 being coupled to the movable element of a solenoid designated 12 while the other has a balance-weight or other means 16 associated therewith which will tend to move said lever angularly on de-energisation of the solenoid. The movable element or striker associated with each stop may comprise a spring operated plunger or the like 17 which is associated with or forms an integral part of a limit switch 18 as indicated in Figures 2 and 3 or which, as is indicated in Figure 4, is carried by a pivoted or spring arm 19 carried by the stop and adapted to co-operate with the actuating element 20 of a limit switch 21. If desired, the construction may be such that the positions of the several stations will be adjustable at will to suit any particular requirements.

I claim:

1. In a conveyor system including a driven conveyor chain moving along a predetermined path and a plurality of load carriers freely supported on the chain so that, while the load carriers are normally transported by the chain along the conveyor path, the load carriers may be halted at any time without interrupting the movement of the conveyor chain, each of the load carriers having a depending load bar capable of limited vertical movement between upper and lower positions corresponding respectively to the unloaded and loaded conditions thereof; indexing mechanism comprising an abutment member on each of the load bars and movable vertically with the latter, a fixed stop member disposed at a predetermined location adjacent the conveyor path and projecting into the path of the abutment member on a load bar as the related carrier is moved to said location with its load bar in the loaded, lower position thereof so that said fixed stop member then engages the abutment member and halts the related carrier until the load is removed from the latter and the abutment member is released from the fixed stop member by movement of the load bar to its unloaded, upper position, a movable stop member disposed at a location adjacent the conveyor path which is spaced from said fixed stop member in the direction opposed to the movement of the conveyor chain, said movable stop member being movable between operative and inoperative positions wherein it respectively projects into, and is spaced from, the path of the abutment members with the related load bars in the loaded, lower position of the latter, means urging said movable stop member to said operative position thereof, a solenoid connected to said movable stop member and adapted, when energized, to dispose said movable stop member in said inoperative position of the latter, an electric circuit for energizing said solenoid and having normally closed contacts therein, a depressible actuating element for said contacts normally projecting from said fixed stop member and depressed by engagement of the abutment member on a load bar with said fixed stop member to then open said contacts, thereby de-energizing said solenoid and permitting movement of said movable stop member to said operative position of the latter, so that the movable stop member can then be engaged by the abutment member of a following loaded load carrier to halt the latter at said location of the movable stop member until the load carrier halted by said fixed stop member has been unloaded to disengage the abutment member thereof from said fixed stop member and said actuating element, whereupon, said actuating element can again project from the fixed stop member to close said contacts and energize said solenoid for returning the movable stop member to its inoperative position, thereby permitting the loaded load carrier previously halted by said movable stop member to move on to the location of said fixed stop member.

2. In a conveyor system; an indexing mechanism according to claim 1, further comprising a second movable stop member disposed at a location adjacent the conveyor path which is spaced from the location of the first mentioned movable stop member in the direction opposed to the movement of the conveyor chain, said second movable stop member being movable between operative and inoperative positions wherein it respectively projects into, and is spaced from, the path of the abutment members with the related load bars in the loaded, lower position of the latter, means urging said second movable stop member to said operative position thereof, a second solenoid connected to said second movable stop member and adapted, when energized, to dispose said second movable stop member in said inoperative position of the latter, a second electric circuit for energizing said second solenoid and having normally closed contacts therein, a second depressible actuating element for said contacts of the second circuit normally projecting from said first movable stop member and depressed by engagement of the abutment member of a loaded load carrier with said first movable stop member to then open said contacts of the second circuit, thereby de-energizing said second solenoid and permitting movement of said second movable stop member to said operative position thereof where said second movable stop member can halt a loaded load carrier at said location thereof until said first movable stop member is returned to its inoperative position, whereupon, said second actuating element is again free to project therefrom for closing said contacts of the second circuit, whereby said second solenoid is again energized to return said second movable stop member to said inoperative position of the latter.

3. In a conveyor system; an indexing mechanism according to claim 1, wherein said movable stop member includes a pivoted element having an abutment engageable stop at one end movable between said operative and inoperative positions of the movable stop member, and said means urging said movable stop member to its operative position includes counterweight means acting on said pivoted element to cause the latter to swing in the direction moving said abutment engageable stop to said operative position thereof.

References Cited in the file of this patent
UNITED STATES PATENTS

| | | |
|---|---|---|
| 1,778,484 | Da Costa | Oct. 14, 1930 |
| 1,814,026 | Draeger | July 14, 1931 |
| 1,986,420 | Webb et al. | Jan. 1, 1935 |
| 2,161,388 | Rosenthal | June 6, 1939 |
| 2,256,684 | Morgan et al. | Sept. 23, 1941 |
| 2,344,155 | McBride et al. | Mar. 14, 1944 |
| 2,427,057 | Knox | Sept. 9, 1947 |
| 2,612,847 | Burrows | Oct. 7, 1952 |
| 2,619,916 | Rainier | Dec. 22, 1952 |